(12) United States Patent
Satsuma

(10) Patent No.: US 9,005,019 B2
(45) Date of Patent: Apr. 14, 2015

(54) GAME SYSTEM

(71) Applicant: DeNA Co., Ltd., Tokyo (JP)

(72) Inventor: Sadaaki Satsuma, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 99 days.

(21) Appl. No.: 13/852,713

(22) Filed: Mar. 28, 2013

(65) Prior Publication Data

US 2013/0310169 A1     Nov. 21, 2013

(30) Foreign Application Priority Data

Apr. 23, 2012  (JP) .................................. 2012-098019

(51) Int. Cl.
| | | |
|---|---|---|
| G06F 17/00 | (2006.01) | |
| A63F 13/00 | (2014.01) | |
| A63F 13/30 | (2014.01) | |
| A63F 13/35 | (2014.01) | |
| A63F 13/795 | (2014.01) | |
| A63F 13/75 | (2014.01) | |

(52) U.S. Cl.
CPC ................. A63F 13/00 (2013.01); A63F 13/12 (2013.01); A63F 2300/575 (2013.01); A63F 13/35 (2014.09); A63F 13/795 (2014.09); A63F 13/75 (2014.09)

(58) Field of Classification Search
CPC ....................................................... A63F 13/00
USPC ................................... 463/16, 20, 25, 29–31
See application file for complete search history.

(56) References Cited

U.S. PATENT DOCUMENTS

| | | | | |
|---|---|---|---|---|
| 2013/0301169 A1* | 11/2013 | Weeks et al. | .................... | 361/42 |
| 2013/0303266 A1* | 11/2013 | Kishimoto et al. | ............. | 463/25 |
| 2013/0316835 A1* | 11/2013 | Takagi et al. | ................... | 463/42 |
| 2014/0113708 A1* | 4/2014 | Lee et al. | ......................... | 463/25 |

FOREIGN PATENT DOCUMENTS

JP          2009-187143 A     8/2009

OTHER PUBLICATIONS

Isao Moriyasu, "Certificate for Application of Provision of Exception to Lack of Novelty on Invention" with English Translation, Publication http://sp.mbga.jp/gcard/info/info_120402_traderrulechange.html (Apr. 2, 2012), date of submission May 21, 2012, 7 pages.
Japanese Office Action mailed on Apr. 15, 2014 in connection with Japanese Patent Application No. 2012-098019 and English translation.

* cited by examiner

*Primary Examiner* — Ronald Laneau
(74) *Attorney, Agent, or Firm* — Pillsbury Winthrop Shaw Pittman LLP

(57) ABSTRACT

One object is to provide a game system that can restrain real money trade from a technical aspect. In accordance with one aspect, a game system according to an embodiment of the present invention includes: a bid data generating unit configured to generate bid data including constant information related to a bid game content while not including either player specifying information of a bidder player or variable information of the bid game content and a second display control unit configured to cause a bid screen generated from the generated bid data to be displayed in a game played by an exhibitor player.

16 Claims, 14 Drawing Sheets

| Player Identification | Game Content Identification 1 | Game Content Identification 2 | Game Content Identification 3 | Game Content Identification 4 | ... | Game Content Identification 50 |
|---|---|---|---|---|---|---|
| 000001 | 00000001 | 00000125 | 00000130 | 00000135 | ... | 20300209 |
| 000002 | 00000005 | 20000012 | 20000015 | 20000018 | ... | 21008901 |
| 000003 | 10000001 | 10030004 | N/A | N/A | ... | 25006104 |
| 000004 | 10000042 | 10201002 | N/A | N/A | ... | N/A |
| 000005 | 10000031 | N/A | N/A | N/A | ... | N/A |
| ... | ... | ... | ... | ... | ... | ... |

Fig. 4

| Game Content Identification | Level | Offensive Power | Defensive Power | Mobility | Name | Image | ... |
|---|---|---|---|---|---|---|---|
| 00000001 | 20 | 114 | 86 | 102 | Machine B | http://mmmbbb/bbb.jpg | ... |
| 00000002 | 12 | 152 | 57 | 187 | Vehicle A | http://wvaaa.aaa.jpg | ... |
| 00000003 | 3 | 95 | 88 | 41 | Machine C | http://mmmccc/ccc.jpg | ... |
| 00000004 | 19 | 98 | 95 | 193 | Machine D | http://mmmddd/ddd.jpg | ... |
| 00000005 | 14 | 53 | 67 | 62 | Machine E | http://mmmeee/eee.jpg | ... |
| ... | ... | ... | ... | ... | ... | ... | ... |
| 000000125 | 1 | 28 | 49 | 124 | Machine A | http://mmmaaa/aaa.jpg | |
| ... | ... | ... | ... | ... | ... | ... | ... |
| 10000031 | 9 | 125 | 102 | 68 | Machine C | http://mmmccc/ccc.jpg | ... |
| ... | ... | ... | ... | ... | ... | ... | ... |

Fig. 5

| Exhibition Request Identification | Exhibitor Player Identification | Exhibited Game Content | Desired Condition 1 | Desired Condition 2 | Exhibition Period | ... |
|---|---|---|---|---|---|---|
| A000001 | 000001 | 00000125 | MS12 | 001 | April 9, 9:00 | ... |
| A000002 | 000001 | 00000001 | N/A | N/A | April 10, 12:00 | ... |
| A000003 | 000004 | 10000042 | ITEM53 | 131 | Arpil 9, 14:51 | ... |
| A000004 | 002987 | 33890421 | N/A | N/A | April 11, 18:00 | ... |
| A000005 | 010812 | 20500911 | ITEM01 | 020 | April 10, 9:15 | ... |
| ... | ... | ... | ... | ... | ... | ... |

Fig. 6

| Player Identification Information | Player Name | Avatar | ... |
|---|---|---|---|
| 000001 | chapin | http://aaaaaaa/aaa.jpg | ... |
| 000002 | Yuki | http://bbbbbb/bbb.jpg | ... |
| 000003 | Azusa | http://ccccccc/ccc.jpg | ... |
| 000004 | Riku | http://dddddd/ddd.jpg | ... |
| 000005 | Akiko | http://eeeeee/eee.jpg | ... |
| ... | ... | ... | ... |

Fig. 7

| Player Identification | Game Content Identification 1 | Game Content Identification 2 | ... | Game Content Identification 50 |
|---|---|---|---|---|
| 000001 | 00000001 | 10000031 | ... | 20300209 |
| 000002 | 00000005 | 20000012 | ... | 21008901 |
| 000003 | 10000001 | 10030004 | ... | 25006104 |
| 000004 | 10000042 | 10201002 | ... | N/A |
| 000005 | 00000125 | N/A | ... | N/A |
| ... | ... | ... | ... | ... |

| Player Name | Player Identification | Group Identification |
|---|---|---|
| Player 1 | 000001 | 01 |
| Player 2 | 000002 | 02 |
| Player 3 | 000003 | 01 |
| Player 4 | 000004 | 02 |
| Player 5 | 000005 | 01 |

(b)

| Player Name | Player Identification | Group Identification |
|---|---|---|
| Player 1 | 000001 | 01 |
| Player 2 | 000002 | 01 |
| Player 3 | 000003 | 02 |
| Player 4 | 000004 | 02 |
| Player 5 | 000005 | 02 |

(a)

| Group Name | Access-enabled Group 1 | Access-enabled Group 2 | Access-enabled Group 3 |
|---|---|---|---|
| Group 1 | Group 1 | Group 5 | Group 21 |
| Group 2 | Group 2 | Group 3 | Group 13 |
| Group 3 | Group 3 | Group 7 | Group 9 |
| Group 4 | Group 4 | Group 9 | Group 10 |
| Group 5 | Group 5 | Group 1 | Group 8 |
| ... | ... | ... | ... |

(b)

| Group Name | Access-enabled Group 1 | Access-enabled Group 2 | Access-enabled Group 3 |
|---|---|---|---|
| Group 1 | Group 1 | Group 3 | Group 19 |
| Group 2 | Group 2 | Group 4 | Group 8 |
| Group 3 | Group 3 | Group 1 | Group 20 |
| Group 4 | Group 4 | Group 2 | Group 15 |
| Group 5 | Group 5 | Group 7 | Group 11 |
| ... | ... | ... | ... |

Fig. 16

|  | Player Identification | Company 1 | Company 2 | Company 3 |
|---|---|---|---|---|
| Player 1 | 000001 | 000002 | 000005 | N/A |
| Player 2 | 000002 | 000001 | 000015 | N/A |
| Player 3 | 000003 | N/A | N/A | N/A |
| Player 4 | 000004 | 000009 | 001203 | 001945 |
| Player 5 | 000005 | 000001 | N/A | N/A |

Fig. 17

GAME SYSTEM

CROSS-REFERENCE TO RELATED APPLICATIONS

This application is based on and claims the benefit of priority from Japanese Patent Application Serial No. 2012-98019 (filed on Apr. 23, 2012), the contents of which are hereby incorporated by reference in their entirety.

TECHNICAL FIELD

The present invention relates to a game system.

BACKGROUND

So-called online games have become popular, wherein a game system implemented on a server device provides game data to a plurality of terminal devices via a communication network, and the plurality of terminal devices simultaneously progress a game using the provided game data.

Some online games may provide functions for exchanging virtual in-game cards and items (e.g., weapons) between the players, so as to encourage interaction between players. One method of exchanging in-game items between players is discussed in Japanese Patent Application Publication No. 2009-187143 ("the '143 Publication").

SUMMARY

As discussed in the '143 Publication, some players sell and buy cards and items in real currency. Such a trade in real currency is called "real money trade" or RMT. If such real money trade is left uncontrolled, only part of players can play the game with an extremely advantageous condition, which may cause loss of game balance. In order to tackle this problem, online game providers prohibit real money trade in the user agreement and suspends play of the game for users who has violated the user agreement, thereby trying to restrain the real money trade.

However, even with strict application of such user agreement, there have been challenges to fully restrain real money trade. Therefore, various embodiments of the present invention provide a game system that restrains real money trade from a technical aspect.

A game system according to an embodiment of the present invention comprises: a game program storage unit configured to store one or more game programs for performing a game using at least a first game content and a second game content; a game content identification information storage unit configured to store a first game content identification unique to the first game content in association with a first player identification unique to a first player, and to store a second game content identification unique to the second game content in association with a second player identification unique to a second player; an attribute information storage unit configured to store first attribute information indicating attributes of the first game content in association with the first game content identification, the first attribute information including first variable information varying with progression of the game and first constant information not varying with progression of the game, and to store second attribute information indicating attributes of the second game content in association with the second game content identification, the second attribute information including second variable information varying with progression of the game and second constant information not varying with progression of the game; a player specifying information storage unit configured to store first player specifying information for specifying the first player and second player specifying information for specifying the second player; an exhibition data generating unit configured to generate exhibition data including the first attribute information; a first display control unit configured to cause an exhibition screen generated based on the exhibition data to be displayed in the game played by the second player; a bid request receiving unit configured to receive from the second player a bid request including the first game content identification and the second game content identification; a bid data generating unit configured to generate bid data based on the bid request, the bid data including the second constant information while not including either the second player specifying information or the second variable information; a second display control unit configured to cause a bid screen generated based on the bid data to be displayed in the game played by the first player; an exchange confirmation request receiving unit configured to receive from the first player an exchange confirmation request including the second game content identification; and a game content identification information updating unit configured to update the game content identification information storage unit based on the exchange confirmation request such that the first game content identification is stored in association with the second player identification, and the second game content identification is stored in association with the first player identification.

A game system according to an embodiment of the present invention comprises: a game program storage unit configured to store one or more game programs for performing a game using at least a first game content and a second game content; a game content identification information storage unit configured to store a first game content identification unique to the first game content in association with a first player identification unique to a first player, and to store a second game content identification unique to the second game content in association with a second player identification unique to a second player; an attribute information storage unit configured to store first attribute information indicating attributes of the first game content in association with the first game content identification, the first attribute information including first variable information varying with progression of the game and first constant information not varying with progression of the game, and to store second attribute information indicating attributes of the second game content in association with the second game content identification, the second attribute information including second variable information varying with progression of the game and second constant information not varying with progression of the game; a player specifying information storage unit configured to store first player specifying information for specifying the first player and second player specifying information for specifying the second player; an exhibition data generating unit configured to generate exhibition data including the first constant information while not including either the first player specifying information or the first variable information; a first display control unit configured to cause an exhibition screen generated based on the exhibition data to be displayed in the game played by the second player; a bid request receiving unit configured to receive from the second player a bid request including the first game content identification and the second game content identification; a bid data generating unit configured to generate bid data based on the bid request, the bid data including the second attribute information; a second display control unit configured to cause a bid screen generated based on the bid data to be displayed in the game played by the first player; an exchange confirmation request receiving unit configured to receive from the first player an exchange confirmation request including the second game content identification; and a game content identification information updating unit configured to update the game content identification information storage unit based on the exchange confirmation request such that the first game content identification is stored in association with the second player identification, and the second game content identification is stored in association with the first player identification.

A method using a computer according to an embodiment of the present invention comprises the steps of: storing one or more game programs for performing a game using at least a first game content and a second game content; storing a first game content identification unique to the first game content in association with a first player identification unique to a first player, and to store a second game content identification unique to the second game content in association with a second player identification unique to a second player; storing first attribute information indicating attributes of the first game content in association with the first game content identification, the first attribute information including first variable information varying with progression of the game and first constant information not varying with progression of the game, and to store second attribute information indicating attributes of the second game content in association with the second game content identification, the second attribute information including second variable information varying with progression of the game and second constant information not varying with progression of the game; storing first player specifying information for specifying the first player and second player specifying information for specifying the second player; generating exhibition data including the first attribute information; causing an exhibition screen generated based on the exhibition data to be displayed in the game played by the second player; receiving from the second player a bid request including the first game content identification and the second game content identification; generating bid data based on the bid request, the bid data including the second constant information while not including either the second player specifying information or the second variable information; causing a bid screen generated based on the bid data to be displayed in the game played by the first player; receiving from the first player an exchange confirmation request including the second game content identification; and updating the game content identification information storage unit based on the exchange confirmation request such that the first game content identification is stored in association with the second player identification, and the second game content identification is stored in association with the first player identification.

A method using a computer according to an embodiment of the present invention comprises the steps of: storing one or more game programs for performing a game using at least a first game content and a second game content; storing a first game content identification unique to the first game content in association with a first player identification unique to a first player, and to store a second game content identification unique to the second game content in association with a second player identification unique to a second player; storing first attribute information indicating attributes of the first game content in association with the first game content identification, the first attribute information including first variable information varying with progression of the game and first constant information not varying with progression of the game, and to store second attribute information indicating attributes of the second game content in association with the second game content identification, the second attribute information including second variable information varying with progression of the game and second constant information not varying with progression of the game; storing first player specifying information for specifying the first player and second player specifying information for specifying the second player; generating exhibition data including the first constant information while not including either the first player specifying information or the first variable information; causing an exhibition screen generated based on the exhibition data to be displayed in the game played by the second player; receiving from the second player a bid request including the first game content identification and the second game content identification; generating bid data based on the bid request, the bid data including the second attribute information; causing a bid screen generated based on the bid data to be displayed in the game played by the first player; receiving from the first player an exchange confirmation request including the second game content identification; and updating the game content identification information storage unit based on the exchange confirmation request such that the first game content identification is stored in association with the second player identification, and the second game content identification is stored in association with the first player identification.

Various embodiments of the present invention provide a game system that restrains real money trade from a technical aspect.

BRIEF DESCRIPTION OF THE DRAWINGS

FIG. 4 shows an example of game content identification information table included in a game content identification information storage unit used in a game system according to the embodiment of the present invention.

FIG. 5 shows an example of attribute information management table included in an attribute information storage unit used in a game system according to the embodiment of the present invention.

FIG. 6 shows an example of exhibition request management table used in a game system according to the embodiment of the present invention.

FIG. 7 shows an example of player specifying information table used in a game system according to the embodiment of the present invention.

FIG. 14 shows an example of game content identification information table after updating used in a game system according to the embodiment of the present invention.

FIGS. 16(a) and 16(b) show examples of group classification table used in a game system according to an embodiment of the present invention.

FIG. 17 shows an example of player management table used in a game system according to an embodiment of the present invention.

DESCRIPTION OF EXAMPLE EMBODIMENTS

Figure 1:
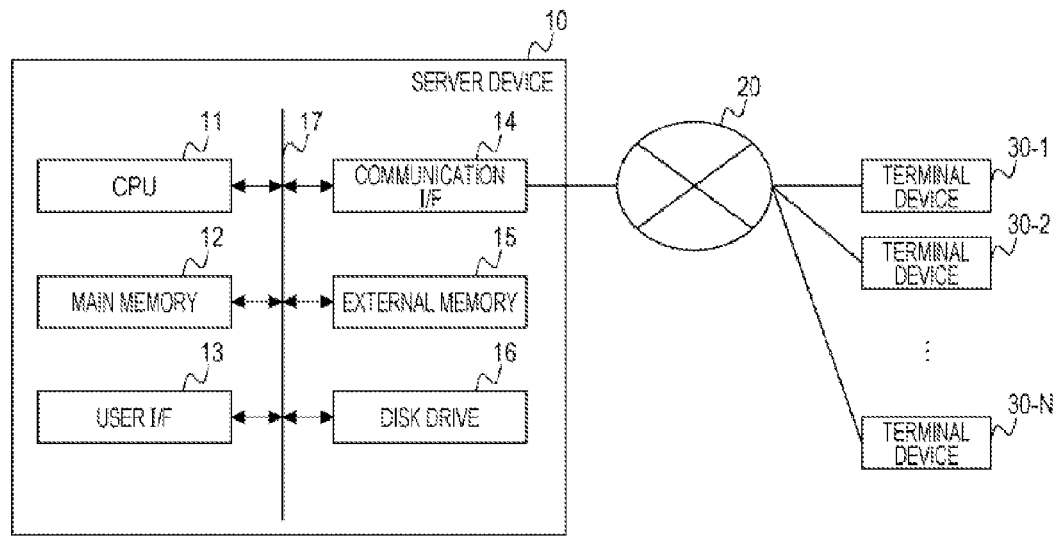
FIG. 1 is a block diagram schematically illustrating the architecture of a game system according to an embodiment of the present invention.

Various embodiments of the present invention will be described hereinafter with reference to the appended drawings. In the drawings, the same components are denoted by the same reference numerals.

FIG. 1 is a block diagram schematically illustrating the architecture of a game system according to an embodiment of the present invention. As illustrated in FIG. 1, in the embodiment of the present invention, an online game server device 10 (hereinafter also referred to simply as the "server device 10") may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 is an example of a device implementing part or all of a game system according to the embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11.

The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive, and store various programs such as a game program for allowing the terminal device 30 to execute an online game and a control program for controlling the progress of the online game. The game program may be created using, for example, Adobe Flash™, which is a format developed by Adobe Systems Incorporated to handle moving images, games, and the like. The game program created using Adobe Flash™ may be stored in the external memory 15 as a small web format (SWF) file. The game program will be described later. The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, data of a game program or the like stored in a storage medium may be read by the disk drive 16, and may be installed into the external memory 15.

The terminal device 30 may be any information processing device capable of executing and operating a game program stored on the server device 10 and displayed on a web browser, non-limiting examples of the terminal device 30 including a mobile phone, a smartphone, a game console, a personal computer, a tablet, or an electronic book reader. Additionally, the terminal device 30 may be capable of receiving a game program from the server device 10 through a communication I/F 34 (described later) for executing the game.

Figure 2:
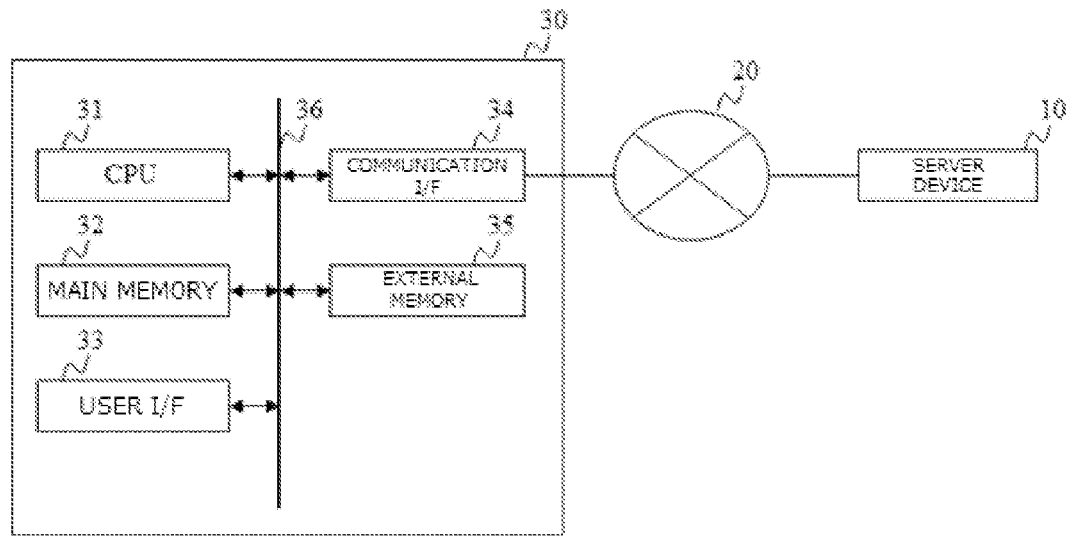
FIG. 2 is a block diagram schematically illustrating the architecture of a terminal device used in a game system according to the embodiment of the present invention.

The architecture of these various terminal devices 30 will be described with reference to FIG. 2. FIG. 2 is a block diagram schematically illustrating the architecture of a terminal device 30 according to an embodiment of the present invention. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game program from the server device 10 via the communication I/F 34, the external memory 35 may store the received game program.

The terminal device 30 having such architecture may be provided with, for example, browser software for interpreting a hypertext markup language (HTML) file and displaying a screen, and plug-in software (e.g., Flash Player distributed by Adobe Systems Incorporated) incorporated in the browser software. The terminal device 30 may acquire an SWF file embedded in an HTML file from the server device 10, and execute the SWF file using the browser software and plug-in software, and therefore the user of the terminal device 30, or a game player, may be provided with a gaming function.

A game program will now be described with reference to FIGS. 1 and 2. The game program may be stored on the external memory 15 of the server device 10 in various forms. For example, the game program may be provided as a piece of application software executable on various application execution platforms. The player is able to execute or operate a game application using the terminal device 30.

The external memory 15 of the server device 10 may store game programs for executing or operating various games executable or operable on the terminal device 30. The game programs may be created using, for example, script languages such as ActionScript™ and JavaScript™, or object-oriented programming languages such as Objective-C™ and Java™. The game programs may be executed and/or operated on a platform installed on the terminal device 30. A game program to be stored on the external memory 15 may be produced by modifying a web page created in a markup language such as HTML5 by using a style sheet such as Cascading Style Sheet 3 (CSS3). Such a web page created in a markup language may be executed or operated by the browser software installed on the terminal device 30. The external memory 15 of the server device 10 may store a desired number of game programs, and a game program for executing and/or operating a game selected by the terminal device 30 may be provided to a desired number of terminal devices 30 via the communication I/F 14 in accordance with control of the CPU 11. In the terminal device 30, the game program sent from the server device 10 may be received via the communication I/F 34 and transferred to the external memory 35 for storage in accordance with control of the CPU 31.

The user of the terminal device 30 may execute or operate the game program to play various games such as action games, role-playing games, interactive baseball games, and card games. The types of the games implemented by the game program are not limited to those explicitly disclosed herein. When a game is executed, for example, animation or an operation icon designated by the program may be displayed on a screen of the terminal device 30. The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™. The terminal device 30 may send information indicating various parameters (such as the number of game points earned and information concerning obtained items) used in the game, and information indicating the status of the game (such as information specifying which mission has been fulfilled) to the server device 10, if necessary. The server device 10 may manage the progress of the individual players in the game in accordance with information received from the plurality of terminal devices 30, such as instructions, information indicating the parameters, and information indicating the statuses. Thus, each player is able to resume the interrupted game from the point where it was interrupted, on the basis of the information concerning the progress of the game held in the server device 10.

Figure 3:
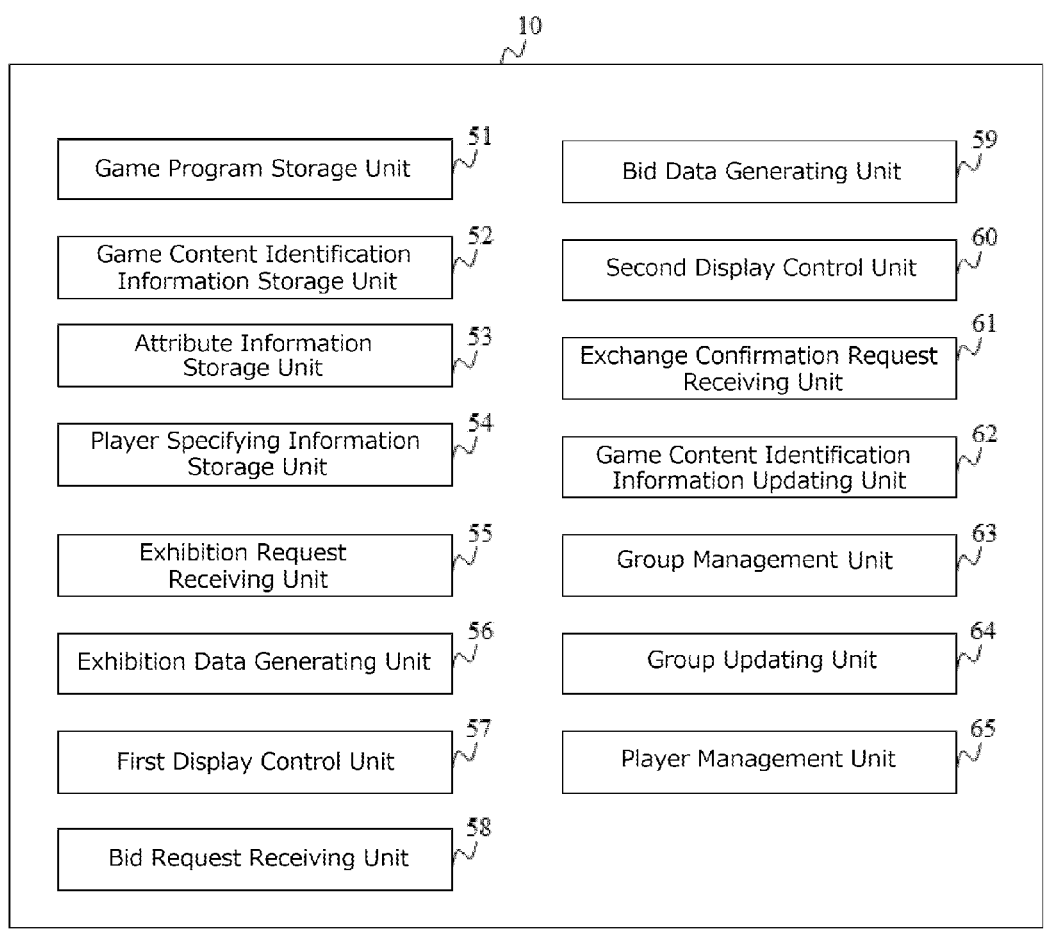
FIG. 3 is a block diagram schematically illustrating the functionality of a server device used in a video game system according to the embodiment of the present invention.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, the server device 10 according to the embodiment comprises a game program storage unit 51, a game content identification information storage unit 52, an attribute information storage unit 53, a player specifying information storage unit 54, an exhibition request receiving unit 55, an exhibition data generating unit 56, a first display control unit 57, a bidding request receiving unit 58, a bid data generating unit 59, a second display control unit 60, an exchange confirmation request receiving unit 61, a game content identification information updating unit 62, a group management unit 63, a group updating unit 64, and a player management unit 65.

The game program storage unit 51 may store game programs for performing various games that can be performed on the terminal device 30. A user of the terminal device 30 may obtain game programs stored on the game program storage unit 51 and run the obtained game programs on the terminal device 30, thereby to play the game on the terminal device 30. As stated above, various games may be performed on the terminal device 30. The games performed on the terminal device 30 may use various game contents such as electronic cards, items, and virtual currency used in the games.

The term "game contents" collectively refers to electronic data used by players for progressing the games and including, for example, cards, items, avatars, and virtual currency. In an embodiment of the present invention, the game contents may be obtained, owned, used, managed, exchanged, fused, reinforced, sold, discarded, and/or presented by players in the games in accordance with progression of the games; and the use of the game contents is not limited to those explicitly described herein. In selling of a card in a game, a player may be paid in virtual currency used in the game, not in real currency, for the card sold. A card used as a game content has attribute information assigned thereto (e.g., "level," "offensive power," "defensive power," and "game content name") required for the progression of a game. At least part of these attribute information may be updated in accordance with progression of the game. The attribute information will be described in detail later. A player can progress the game using the card having updated attribute values. A game that uses a card as a game content may be called a card game. In the card game, a player can own one or more cards and use the cards to fulfill a mission and battle with other players, non-player characters, etc., thereby progressing the game. The Applicant provides various card games on Mobage™ platform.

A player of a game stored on the game program storage unit 51 can obtain and own various game contents in accordance with the progression of the game. The game content identification information storage unit 52 may store game content identification of game contents owned by each player in a game content identification information table, in association with player identification unique to the player owning the game content. When the player newly obtains a game content, the game content identification information storage unit 52 may store the game content identification for identifying the game content, in association with player identification unique to the player who obtained the game content, thereby updating the game content identification information table.

"Player identification" may include an identification code that identifies a player of a game and may be composed of, for example, a six-digit number. The code system of the player identification is not limited to those explicitly described herein and may be configured desirably. For example, the player identification may also include an alphabetic character. Typically, the player identification may be assigned to a player, for example, when the player first logs in a game, and may be reused for later logins of the player. Thus, the player identification may be unique to a player and identify the player in a game.

"Game content identification" may include of an identification code that identifies a game content owned by a player and is composed of, for example, an eight-digit number. The code system of the game content identification is not limited to those explicitly described herein and may be configured desirably. For example, the game content identification may include an alphabetic character. For example, when the player obtains a game content such as a card and an item in a game, the game content identification is generated to uniquely identify the game content and is stored in the game content identification information table in association with the player identification of the player who obtained the game content.

FIG. 4 shows an example of game content identification information table stored on a game content identification information storage unit 52. As shown, the game content identification information table included in the game system according to an embodiment of the present invention may store a plurality of game content identifications, for example, game content identifications 1 to 50 in association with a player identification. A maximum number may be assigned to the number of game contents that can be owned by a player. FIG. 4 shows an example where a player can own up to 50 game contents. In FIG. 4, the player identified by the player identification number "000001" (hereinafter also referred to as "player 1") owns 50 game contents identified by game content identifications "00000001," "00000125," . . . "20300209." The game content identification information table shown in FIG. 4 is a mere example; in the present invention, variously altered game content identification information tables may be used. Further, the game content identification information storage unit 52 may not be necessarily required to store a game content identification information table, but may manage game content identifications of a plurality of game contents used in the game in association with the player identification of the player owning the game content by using a desired technique known to those skilled in the art. Also, a plurality of the same type of cards may have different game content identifications assigned thereto, because a part of attribute information assigned to cards may vary in accordance with the progression of the game. For example, a card named "machine A" owned by one user may have different game content identification than a same type of card named "machine A" owned by another user.

The game contents are obtained by players as required in accordance with the progression of the game; and thus not all the players own a maximum number of game contents. For example, the player identified by the player identification number "000005" (hereinafter "player 5") may own only one game content identified by the game content identification "10000031." When player 5 obtains a new game content in the game, game content identification identifying the obtained game content may be newly generated, and the generated game content identification may be stored as a record for "Game Content Identification 2" in association with the player identification number "000005."

Further, a player can dispose of his own game content in the game by discarding, selling, etc. For example, player 1 can discard a game content identified by the game content identification "20300209" in the game. By way of an example, when an instruction to discard the game content identified by the game content identification "20300209" is issued, data representing the game content identification "20300209" may be deleted from "Game Content Identification 50" of player 1. When player 1 obtains a new game content after discarding the game content identified by "20300209," game content identification identifying the newly obtained game content may be stored as a record for "Game Content Identification 50" in association with the player identification number "000001."

Thus, the game content identification information storage unit 52 may store game content identification unique to a game content in association with player identification unique to the player owning the game content. As stated above, the association between game content identification and player identification can be altered as necessary when the player obtains, sells, or discards a game content. The game content identification information storage unit 52 may store game content identification unique to a game content in "dynamic" association with player identification unique to the player, so that the change of an owner of a game content is reflected. That is, when the player owning a game content is changed, the association between the game content identification of the game content and the player identification may be altered so that the change of the player owning the game content may be reflected. By way of an example, game contents can be exchanged between players in the game. In this case, the association between the game content identification and the player identification in the game content identification information storage unit 52 may be altered so that the changes of players owning the game contents caused by the exchange are reflected.

As described above, a game content may have various information as "attribute information" assigned thereto representing attributes of the game content. FIG. 5 shows an example of attribute information management table stored on an attribute information storage unit 53. As shown, the attribute information management table included in the game system according to the embodiment of the present invention may store various attribute information assigned to a game content such as level, offensive power, defensive power, game content name, and game content image representing the game content, in association with game content identification of the game content. Attribute information of a game content is not limited to that explicitly disclosed herein. Attribute information of a game content may include various information indicating characteristics, natures, values, types, etc. of the game content. In the embodiment, attribute information of a game content may include variable information such as level that may vary in accordance with progression of the game, and constant information such as name that may not vary in accordance with progression of the game. In the example shown in FIG. 5, "level," "offensive power," "defensive power," and "mobility" may be variable information that often vary (particularly increase) in accordance with progression of the game. On the other hand, "name" and "image" of a game content may be constant information that may remain unchanged in progression of the game. Variable information is not limited to that described herein but may include various information varying in accordance with progression of the game. Constant information is also not limited to that described herein but may include various information not varying or substantially not varying in accordance with progression of the game.

Following is an example of a method of exchanging game contents between players in a game. When a player is to exchange, in a game, a game content for another game content owned by another player, the player may operate a terminal device 30 performing the game to send an exhibition request to the server device 10 so as to exchange the player's own game content for the game content of the other player. The exhibition request may include various information such as the player identification of the player making an exhibition request (hereinafter also referred to as "an exhibitor player"), the game content identification of the game content to be exhibited by the exhibitor player for exchange (herein also referred to as "an exhibited game content"), and desired conditions for a desired game content to be obtained from another player in exchange for the exhibited game content.

For example, player 1 can exhibit a game content identified by the game content identification "00000125" out of his own game contents, for exchange for another game content. In this case, player 1 can send to the server device 10 an exhibition request specifying a game content corresponding to the game content identification "00000125" by using a user interface provided by the terminal device 30. The exhibition request may include, for example, the player identification "000001" of player 1 (an exhibitor player) and the game content identification "00000125" of the exhibited game content. Also, the exhibition request may include desired conditions for the desired game content. The desired conditions may include, for example, at least part of various information representing the type and quantity of cards and items, attributes of cards such as offensive power, and attributes of game contents such as amount of virtual currency. In an embodiment, desired conditions are desirably inputted by an exhibitor player. For example, if the desired conditions include the number of desired game contents, the exhibitor player can input a desired number such as 127. In another embodiment, the desired conditions may be selected from a limited number of options presented by the game. For example, when the desired conditions include the number of desired game contents, 10-increment options ranging from 10 to 200 such as "10," "20," . . . "200" may be presented, and the exhibitor player selects one close to the desired condition from the limited number of options.

The exhibition request sent from the terminal device 30 may be received by the server device 10. The received exhibition request may be received by an exhibition request receiving unit 55. In an embodiment, when receiving an exhibition request, the exhibition request receiving unit 55 may generate an exhibition request identification unique to the exhibition request and store, in the exhibition request management table for example, at least part of information included in the exhibition request in association with the exhibition request identification.

FIG. 6 shows an example of an exhibition request management table that is created, updated, and managed by the exhibition request receiving unit 55. As shown, the exhibition request management table may store the player identification of an exhibitor player, game content identification of an exhibited game content, one or more desired conditions, and an exhibition period representing the duration of the exhibition, for each exhibition request received by the exhibition request receiving unit 55. In the example shown in FIG. 6, the exhibition request identification "A000001" is generated on reception of an exhibition request from player 1, and the exhibition request management table stores the player identification "000001" of player 1, the game content identification "00000125" included in the received exhibition request, the desired conditions "MS12" and "001," and information representing the date and time "4/9 9:00" when the exhibition of the exhibited game content is to be terminated, in association with the exhibition request identification "A000001." For example, the exhibition period may be set to 24 hours after the exhibition request is received from the exhibitor player.

As stated above, various conditions for desired game contents can be set by the exhibitor player as desired conditions. In the example shown in FIG. 6, Condition 1 is set to "MS12" representing the type of the desired game contents, and Condition 2 is set to "001" representing the number of the desired game contents. That is, the exhibition request identified by the exhibition request identification "A000001" indicates that player 1 identified by the player identification "000001" wants to obtain one game content of the type identified by "MS12."

The setting of desired conditions is optional, and desired conditions may not be set. For example, the exhibition request identification "A000004" is an example of a record created based on an exhibition request in which desired conditions are not inputted by the exhibitor player, and thus it contains no data representing the desired conditions in the columns Desired Condition 1 and Desired Condition 2.

Additionally, an exhibition request may include a plurality of game content identifications. For example, player 1 may input a plurality of game content identifications into one exhibition request, thereby to exhibit the game contents identified by the plurality of game content identifications as a set. When an exhibition request includes a plurality of game content identifications, the plurality of game content identifications may be stored in association with one exhibition request identification. For example, when an exhibition request from player 1 includes game content identification "00000130" in addition to game content identification "00000125," both game content identification "00000130" and game content identification "00000125" may be stored in the exhibition request management table in association with the exhibition request identification "A000001."

The server device 10 may store various information for progression of the game, in addition to information on game contents. For example, the player specifying information storage unit 54 may store, for each player, player specifying information that specifies the player. The "player specifying information" may include any information that represents personality and characteristics of a player and specifies the player when presented to another player. In games, a display image representing a player may be generated based on the player specifying information, and the display image may be displayed in the game screen of another player to communicate the personality and the characteristics of the player to the other player. The display images representing the players may express the personalities of the players, thereby encouraging interaction between the players through the game.

The player specifying information may include, for example, information set by the player to characterize the player, such as a player name or avatar. The player name may be desirably determined by the player; therefore, a plurality of players may possibly use the same player name. Accordingly, a player name may not uniquely specify a player, but practically it may serve as an indicator for specifying a player because the number of players interactively playing a game may be limited in terms of time. Therefore, a player name may be herein included in player specifying information that specifies a player. An avatar may also be included in player specifying information for the same reason. That is, many players may play games using avatars having distinctive appearance to express their personalities. To support such needs of players, various items for decorating avatars have been provided as a function of games or a platform for games. Accordingly, an avatar cannot always uniquely specify a player but practically serves for specifying a player because the player may try to personalize the avatar.

The player specifying information storage unit 54 may generate and manage, for example, a player specifying information table illustrated in FIG. 7. The player specifying information table in FIG. 7 may manage various player specifying information such as player names and avatars in association with player identification of each player. Avatars may be stored as, for example, images in JPEG format on the server device 10; the player specifying information management table may manage URLs indicating the location where the images are stored.

The player specifying information may include various information occurring in progression of games, in addition to information desirably set by players such as user names and avatars. For example, the player specifying information may include an exhibition request identification, which is generated based on an exhibition request and uniquely specifies an exhibitor player. Also, the player specifying information may include player identification that specifies a player.

The processing of exhibition request in the server device 10 will be further described. The exhibition data generating unit 56 may refer to the exhibition request management table and the attribute information management table and generate exhibition data for each exhibition request received by the exhibition request receiving unit 55. As will be described below, when the game is played on the terminal device 30, the generated exhibition data may be displayed in a display screen on the terminal device 30 as part of a game screen, such that the content of the exhibition data is communicated to the player of the game.

In the embodiment, the exhibition data generating unit 56 may generate exhibition data for each exhibition request identification stored in the exhibition request management table, the exhibition data including constant information of the exhibited game content associated with the exhibition request identification while not including any of variable information on the exhibited game content and player specifying information. For example, when generating exhibition data for the exhibition request identification "A000001" shown in FIG. 6, the exhibition data generating unit 56 may generate exhibition data that include constant information of the exhibited game content identified by the game content identification "00000125" associated with the exhibition request identification "A000001" but do not include variable information. The constant information for the game content identification "00000125" may be stored in, e.g., the attribute information management table shown in FIG. 5, as described above. The exhibition data generating unit 56 may read out the constant information for the game content identification "00000125" from the attribute information management table and generate exhibition data that include the constant information read out. For example, the exhibition data generating unit 56 may read out, from the attribute information management table shown in FIG. 5, the name "machine A" and the URL indicating the location of the image associated with the game content identification "00000125" and generate exhibition data that include the name "machine A" and the URL indicating the location of the image. The generated exhibition data may not include the variable information associated with the game content identification "00000125," that is, level "1," offensive power "28," defensive power "49," and mobility "124."

Further, the exhibition data generated by the exhibition data generating unit 56 may not include player specifying information of the exhibitor player. For example, the exhibition data generated by the exhibition data generating unit 56 may not include player specifying information such as player name, avatar, and player identification. The exhibition data may include the game content identification that identifies the exhibited game content.

In the example shown, the exhibition data associated with the exhibition request identification "A000001" may be thus generated and include, for example, constant information such as the name "machine A" of the exhibited game content identified by the game content identification "00000125" and the URL of an image representing the game content, and game content identification "00000125," but may not include any of variable information on the exhibited game content such as level, offensive power, defensive power, and mobility and the player specifying information of the exhibitor player.

In the other embodiment of the present invention, the exhibition data generating unit 56 may convert the variable information on the exhibited game content in accordance with a predetermined algorithm and generate exhibition data that include the converted information and the constant information. For variable information that can be numerically represented such as level, offensive power, defensive power, and mobility, any rounding process may be applied to such numerical values to generate rounded information. The generated exhibition data may include the rounded information and the constant information. In this case, the exhibition data may include the constant information such as the name "machine A" of the exhibited game content identified by the game content identification "00000125" and the URL of the image representing the game content, and rounded information generated by rounding variable information such as level, offensive power, defensive power, and mobility, but may not include variable information not rounded such as level, offensive power, defensive power, and mobility of the exhibited game content. Note that variable information such as level, offensive power, defensive power, and mobility that numerically represent attributes of a game content may be herein referred to as "numerical information."

The first display control unit 57 may provide, based on a request sent from a player through a game, one or more exhibition data generated by the exhibition data generating unit 56 to the game played by the player. The player playing a game can send a display request for exhibition data to the server device 10, through operation of the terminal device 30 performing the game. The first display control unit 57 may send exhibition data to the game being performed on the terminal device 30 which sent the request, so that an exhibition screen generated based on the exhibition data can be displayed, for example, as part of a display screen of the game.

Figure 8:
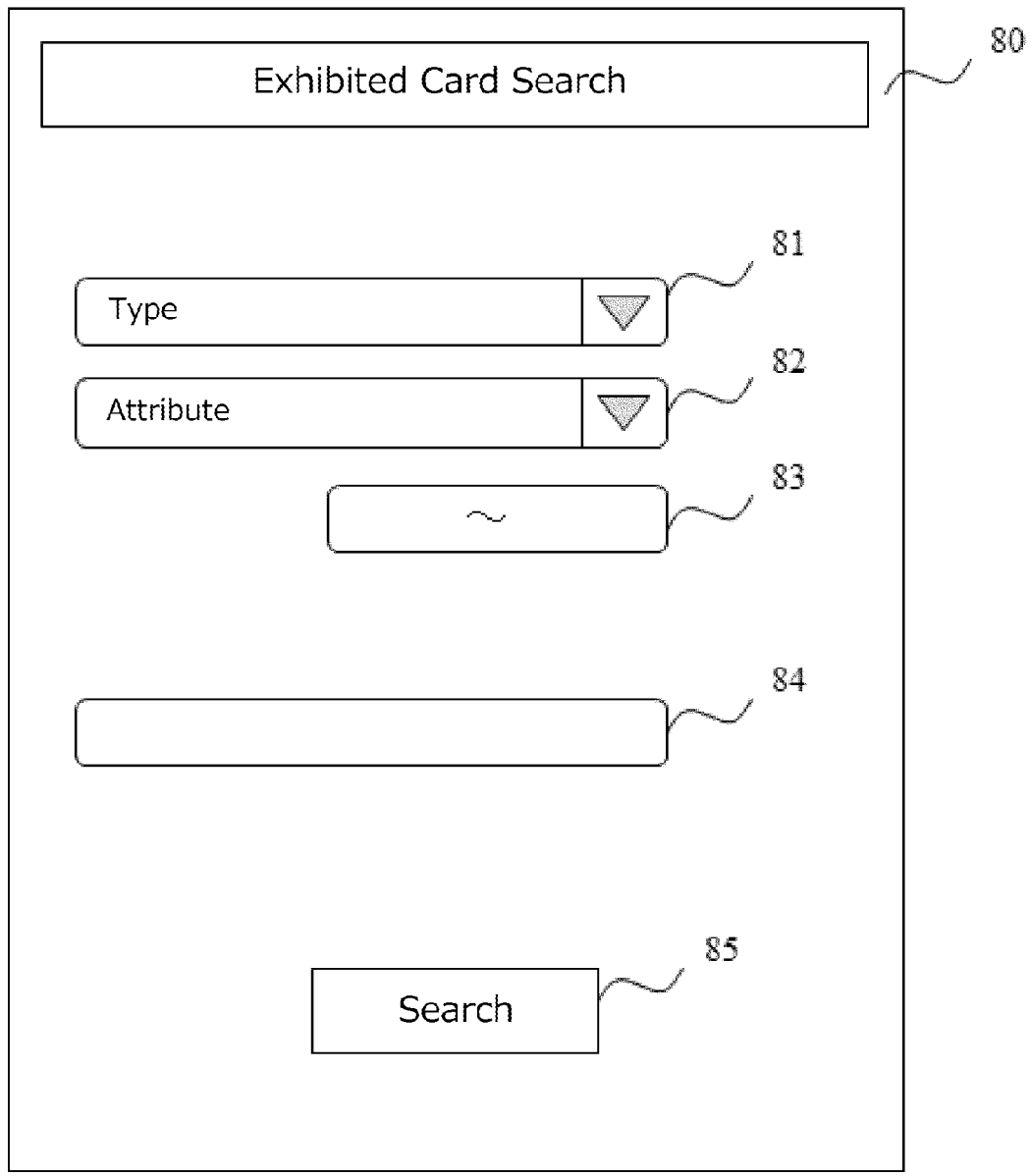
FIG. 8 shows an example of a search screen for searching game contents in a game system according to the embodiment of the present invention.

The display request for exhibition data will be further described. For example, a player playing a game can request display of exhibition data by using a search function for searching exhibited game contents provided as a function of the game. FIG. 8 shows an example of search screen for searching game contents provided as part of functions of the game. For example, the player playing the game can cause the display screen shown in FIG. 8 to be displayed on a display screen of the terminal device 30 performing the game by operating a link or operation button labeled "Exhibition Card Search" displayed in the game screen.

As shown, the search display screen 80 contains pulldown boxes 81, 82 for designating search conditions, an input box 83 for designating numeric range, an input box 84 for designating a search term, and a Search button 85 for running a search.

For example, in a display screen 80 displayed during a game play, a player can operate the pulldown boxes 81, 82 to select from preset search conditions, input a numeric range and a search term to the input boxes 83, 84, and then operate the Search button 85, thereby sending a search request corresponding to the designated search conditions to the server device 10 through a communication function of the terminal device 30. For example, the pulldown box 81 may provide options representing the types of game contents such as "machine," "vehicle," and "character"; and the pulldown box 82 may provide options representing attribute information of game contents such as "offensive power," "defensive power," and "mobility." The input box 83 may accept free input of the player not exceeding a predetermined data amount (in this case, the player can desirably input numerals such as "1231" or text) or provide a limited number of options (e.g., 10-increment options ranging from 10 to 200 such as "10," "20," . . . "200").

For example, the player can select "machine" from the pulldown box 81, select "mobility" from the pulldown box

82, and input "100-200" to the input box 83 (or select "100-200" from the options provided by the input box 83), and then operate the Search button 85, thereby sending to the server device 10 a search request for searching for "game contents having mobility of '100-200' and classified in the type of 'machine.'" Upon receiving the search request, the server device 10 refers to the exhibition request management table, etc. to specify, from the cards being exhibited, exhibited game contents satisfying the search conditions designated in the search request. The first display control unit 57 obtains, from the exhibition data generating unit 56, exhibition data generated for the specified exhibited game contents, and returns search result information including the obtained exhibition data to the terminal device 30 which sent the search request.

Figure 9:
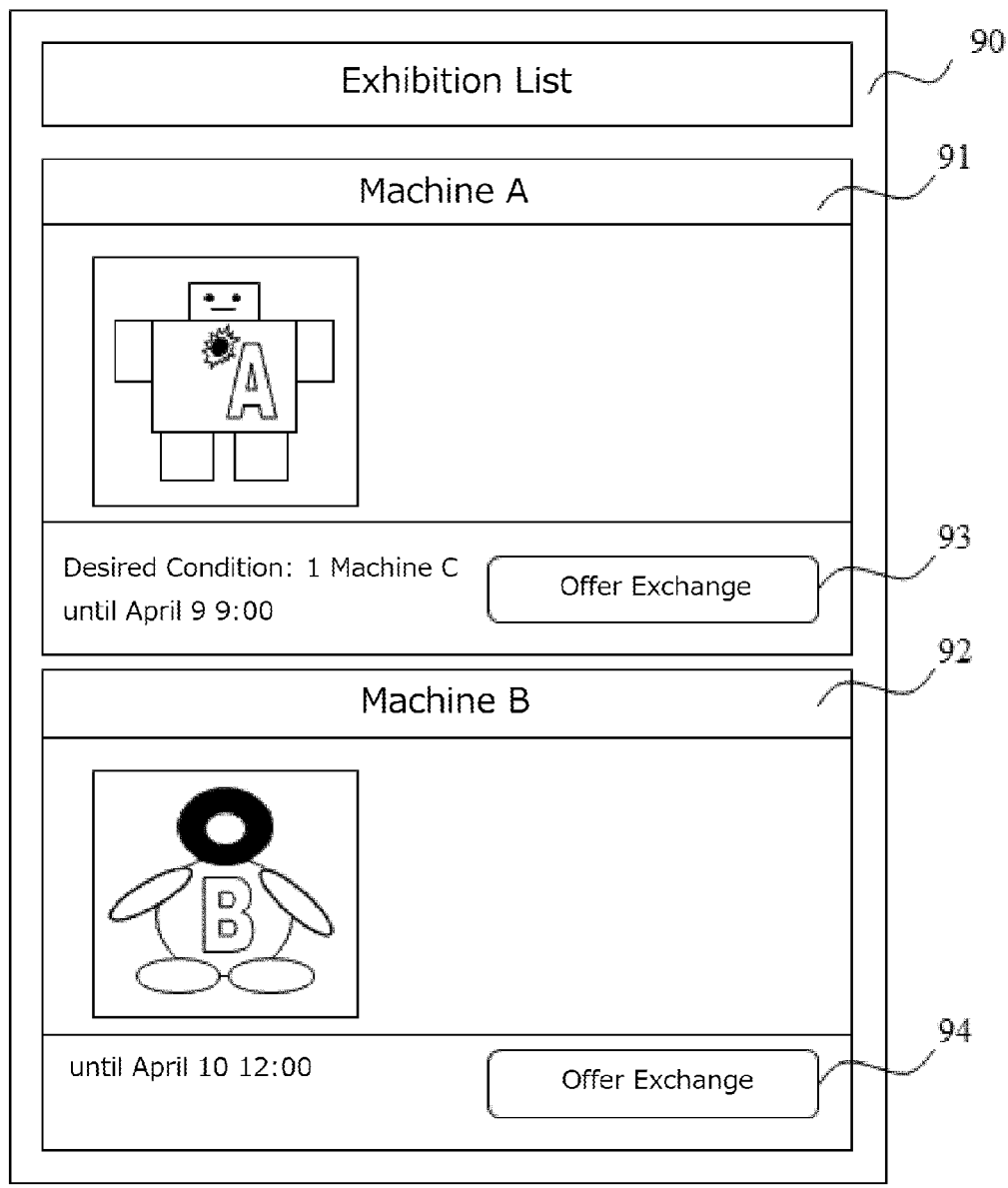
FIG. 9 shows an example of an exhibition screen in a game system according to the embodiment of the present invention.

FIG. 9 is an example of display of search result information returned from the server device 10. Specifically, FIG. 9 shows an example of display of search result corresponding to a search request for searching for "game contents having mobility of '100-200' and classified in the type of 'machine'" with reference to the exhibition request management table shown in FIG. 6. The first display control unit 57 refers to the exhibition request management table to specify exhibited game contents that satisfy the search condition for "game contents having mobility of '100-200' and classified in the type of 'machine.'" For example, when the mobilities of the exhibited game contents associated with the exhibition request identifications "A000001" and "A000002" are set in a rage of "100 to 200," the first display control unit 57 may obtain, from the exhibition data generating unit 56, exhibition data generated for each of the exhibited game contents specified by the game content identification "00000125" associated with "A000001" and the game content identification "00000001" associated with "A000002," generate search result information including the obtained exhibition data, and return the search result information to the terminal device 30 which sent the search request.

The terminal device 30 performing the game may receive the search result information including one or more exhibition data from the first display control unit 57 and perform a drawing process such as rendering based on the received search result information to generate a display screen. The display screen generated based on information including exhibition data is also herein referred to as "an exhibition screen." The generated exhibition screen may be displayed on the display screen of the terminal device 30. That is, the display screen 90 shown in FIG. 9 is an example of an exhibition screen.

As shown in FIG. 9, the display screen 90 displayed on the terminal device 30 may contain an exhibition data display image 91 and an exhibition data display image 92 representing corresponding exhibition data.

The exhibition data display image 91 is an example of the image generated based on the exhibition data with the exhibition request identification "A000001" included in the search result information; and the exhibition data display image 92 is an example of image generated based on the exhibition data with the exhibition request identification "A000002." As shown, the exhibition data display image 91 may include the name "machine A" of the exhibited game content associated with the exhibition request identification "A000001" and the image representing the exhibited game content (both being constant information), but may not include information such as level, offensive power, defensive power, and mobility (being variable information). Likewise, the exhibition data display image 92 may also include the name and the image of the game content included in constant information but may not include variable information such as level.

The exhibition data display image may include various information based on the exhibition data, in addition to the attribute information of the exhibited game content. For example, since the exhibition request identification "A000001" has desired conditions "MS12" and "001," the exhibition data display image 91 corresponding to the exhibition request identification "A000001" contains, in the display area of desired conditions, the text "machine C" corresponding to "MS12" and the text "one" corresponding to "001." Additionally, the generated exhibition data may include the exhibition period included in the exhibition request management table shown in FIG. 6, so that the exhibition period can be displayed as part of the exhibition data display image. For example, since the exhibition request identification "A000001" is associated with an exhibition period "4/9 9:00," the exhibition data display image 91 contains the text "until April 9 9:00" in the display area of exhibition period. The display of the desired conditions and the exhibition period is optional; the exhibition data display image 91 and the exhibition data display image 92 may not include the desired conditions or the exhibition period.

Figure 10:
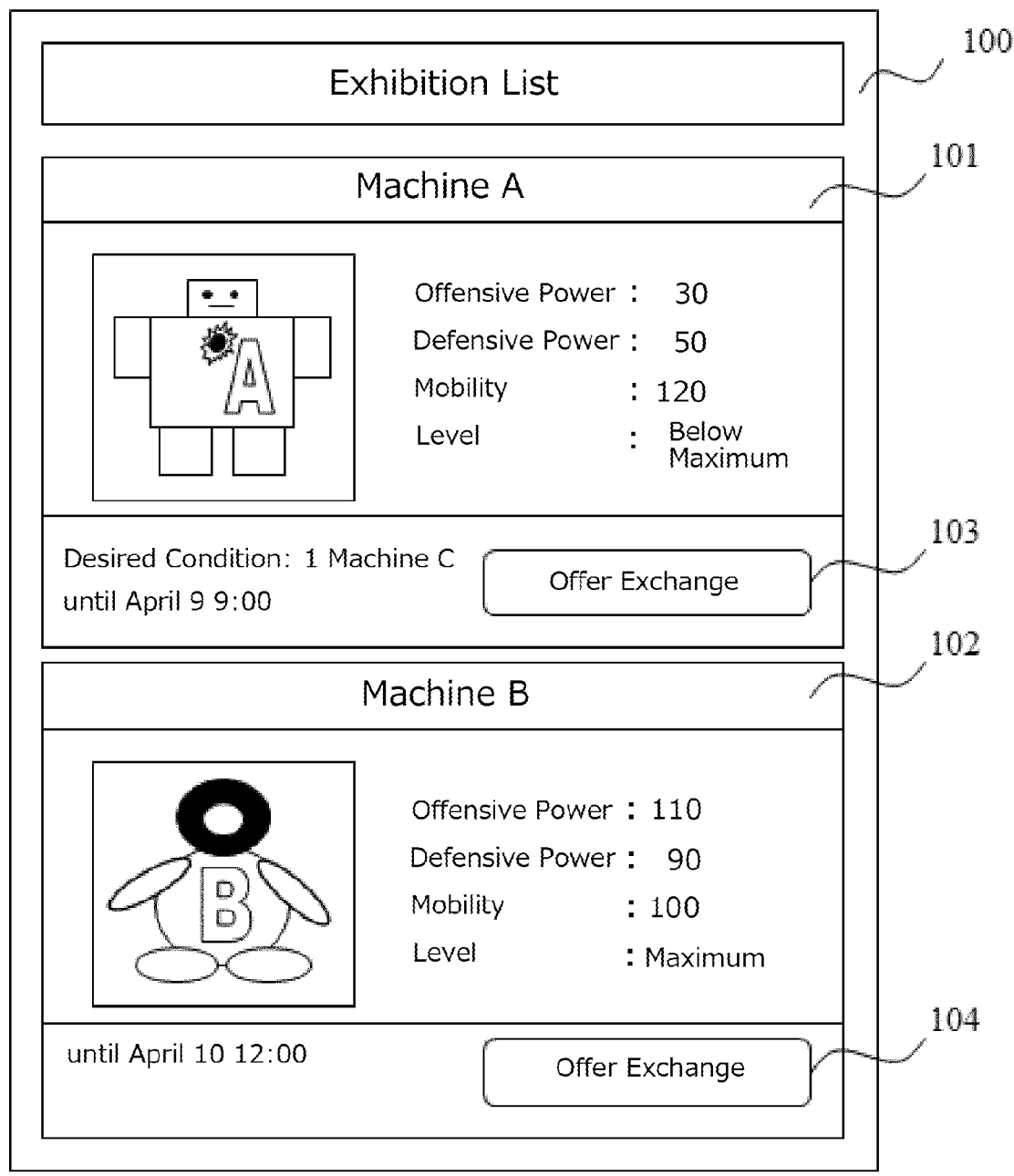
FIG. 10 shows an example of an exhibition screen in a game system according to another embodiment of the present invention.

FIG. 10 shows an example of an exhibition screen in a game system according to another embodiment of the present invention. When exhibition data includes rounded information generated by conversion (e.g., rounding) of variable information such as level or converted information generated by conversion of variable information using a predetermined conversion algorithm, the exhibition screen 100 may include text corresponding to the rounded information or the converted information, as shown in FIG. 10. For example, the exhibition data display image 101 corresponding to the exhibition request identification "A000001" may include rounded information, that is, offensive power "30," defensive power "50," and mobility "120" that are generated by rounding the offensive power "28," defensive power "49," and mobility "124" stored in the attribute information table in association with the game content identification "00000125" corresponding to the exhibition request identification "A000001." For the level, the exhibition data display image 101 may only include text such as "below the maximum" indicating whether the level has reached the predetermined maximum value. The text "below the maximum" for the level is an example of display of converted information. More specifically, the variable information of level "1" is converted into the information representing either one of "the maximum" and "below the maximum" in accordance with whether the level has reached the maximum value, and the converted information may be displayed as a part of the exhibition screen. The variable information may include attribute information rarely increased to the maximum value such as "killer technique level"

If such attribute information rarely increased to the maximum value is displayed as "the maximum," the player may possibly be specified. To prevent this, the embodiment of the present invention may be configured such that a part of converted variable information (e.g., "level" represented by the text "the maximum" or "below the maximum") is displayed in the exhibition screen and the rest of the variable information (e.g., "killer technique level") is not displayed in the exhibition screen. This configuration may increase the difficulty in specifying the player.

Likewise, the exhibition data display image 102 corresponding to the exhibition request identification "A000002" may also include rounded information (e.g., offensive power "110") generated by rounding variable information. As for level, the exhibition data display image 102 may contain the text "the maximum" that indicates that the exhibited game content has reached the maximum level, but may not contain the level itself.

In an embodiment, the exhibition data generating unit 56 may alter the data read out from the exhibition request management table and generate the exhibition data including the altered information. For example, since the desired conditions may be freely inputted by the exhibitor player, it is likely that a desired condition including unnatural information may be maliciously used as a sign for identifying an exhibitor player. Such examples include the exhibition request identification "A000003" in FIG. 6 having Desired Condition 2 set to "131."

In an embodiment, the exhibition data generating unit 56, therefore, may perform rounding to alter input information such as desired conditions freely inputted by the exhibitor player, thereby to generate exhibition data based at least in part on the altered input information; thus, the input information becomes useless as a sign. For example, if Desired Condition 2 is set to "131," it can be rounded to "150" by 50-increment rounding or to "100" by 100-increment rounding. When rounding is performed on "50"-increment basis, the exhibition data display image contains "150" instead of "131" in the display area of desired conditions. Thus, the desired condition cannot serve as a sign.

Additionally, the exhibition period read from the exhibition request management table may be likewise altered by rounding to generate exhibition data by using the altered exhibition period, so that an exhibitor player cannot be specified based on the exhibition period as with the desired conditions. For example, the exhibition request identification "A000003" in FIG. 6 has Exhibition Period set to "4/9 14:51." If "4/9 14:51" is displayed unchanged, "4/9 14:51" may be communicated from the exhibitor player to other players to enable specifying the exhibitor player. Alternatively, if this exhibition period is altered to a rounded time such as "4/9 15:00" (on one hour-increment basis), the exhibitor player is prevented from being specified based on the exhibition period.

On viewing the exhibition screen as shown in FIG. 9 or 10, a player can operate the terminal device 30 to select an exhibition data display image representing a desired game content from the exhibition screen, and send to the server device 10 a bid request for requesting exchange of the player's own game content for the selected game content. For example, when the player operates an operation button 93 (or an operation button 103) labeled "Offer Exchange" displayed as part of the exhibition data display image 91, a bid request may be sent to the server device 10 to bid for the game content corresponding to the exhibition data display image 91 (or the exhibition data display image 101), via functions of game programs and the terminal device 30. The player who performs operations to send a bid request based on the display of the exhibition screen may be herein referred to as "a bidder player." A bidder player may operate the operation button 94 (or the operation button 104) instead of the operation button 93 if it is preferable to exchange for the exhibited game content corresponding to the exhibition data display image 92 (or the exhibition data display image 102).

As is obvious from FIGS. 9 and 10, the display screen 90 or 100 representing an exhibition screen may include neither variable information such as level that varies in accordance with progression of the game nor player specifying information that specifies the exhibitor player among attribute information of the exhibited game content, and may include, among attribute information of the game content, only constant information that does not vary in accordance with the progression of the game. Accordingly, the bidder player can obtain information on the exhibited game content (e.g., the name of the exhibited game content, the image representing the exhibited game content, and information such as rounded offensive power) based on the display screen 90 or 100, but cannot obtain variable information that can serve as a sign or player specifying information that specifies the exhibitor. More specifically, variable information such as the level of a game content may tend to be differentiated for each player because of different progression of the game for each player. For example, the level of a game content may have a fraction that is different for each player. Accordingly, when such variable information is communicated to another player in reality, the player who exhibited the game content may possibly be specified. To prevent this problem, the embodiment of the present invention may be configured such that the generated exhibition data does not include variable information, and an exhibition screen generated based on such exhibition data is presented to other players. This configuration may increase the difficulty in specifying the exhibitor player in a game. Further, when an exhibitor player, not a bidder player, views an exhibition screen related to an exhibited game content exhibited by the exhibitor player himself, the exhibition screen may contain variable information and player specifying information that specifies the exhibitor player.

That is, the variable information on the exhibited game content and the player specifying information that specifies the exhibitor player may be hidden from bidder players or potential bidder players other than the exhibitor player of the exhibited game content.

A bid request may include a first game content identification that identifies a desired exhibited game content, and a second game content identification that identifies a game content owned by the bidder player to be exchanged for the desired exhibited game content (which may be herein referred to as "a bid game content"). A bid request may include player identification of the bidder player, in addition to the above information. For example, when player 5 desires to exchange his own game content identified by the game content identification "10000031" for the exhibited game content represented by the exhibition data display image 91 included in the exhibition screen, the bid request may include the game content identification "00000125" that identifies the exhibition data display image 91, the game content identification "10000031" of the game content to be exchanged, and the player identification "000005" of player 5. The game content identification of the game content represented by the exhibition data display image 91 may be automatically included in the bid request through the function of the software implemented in the terminal device 30 when, for example, the operation button 93 labeled "Offer Exchange" as part of the exhibition data display image 91 is selected Additionally, a bid request may include a plurality of game content identifications, as may an exhibition request. For example, player 5 may input a plurality of game content identifications into one bid request, thereby to exchange the set of game contents identified by the plurality of game content identifications for the exhibited game content.

Figure 11:
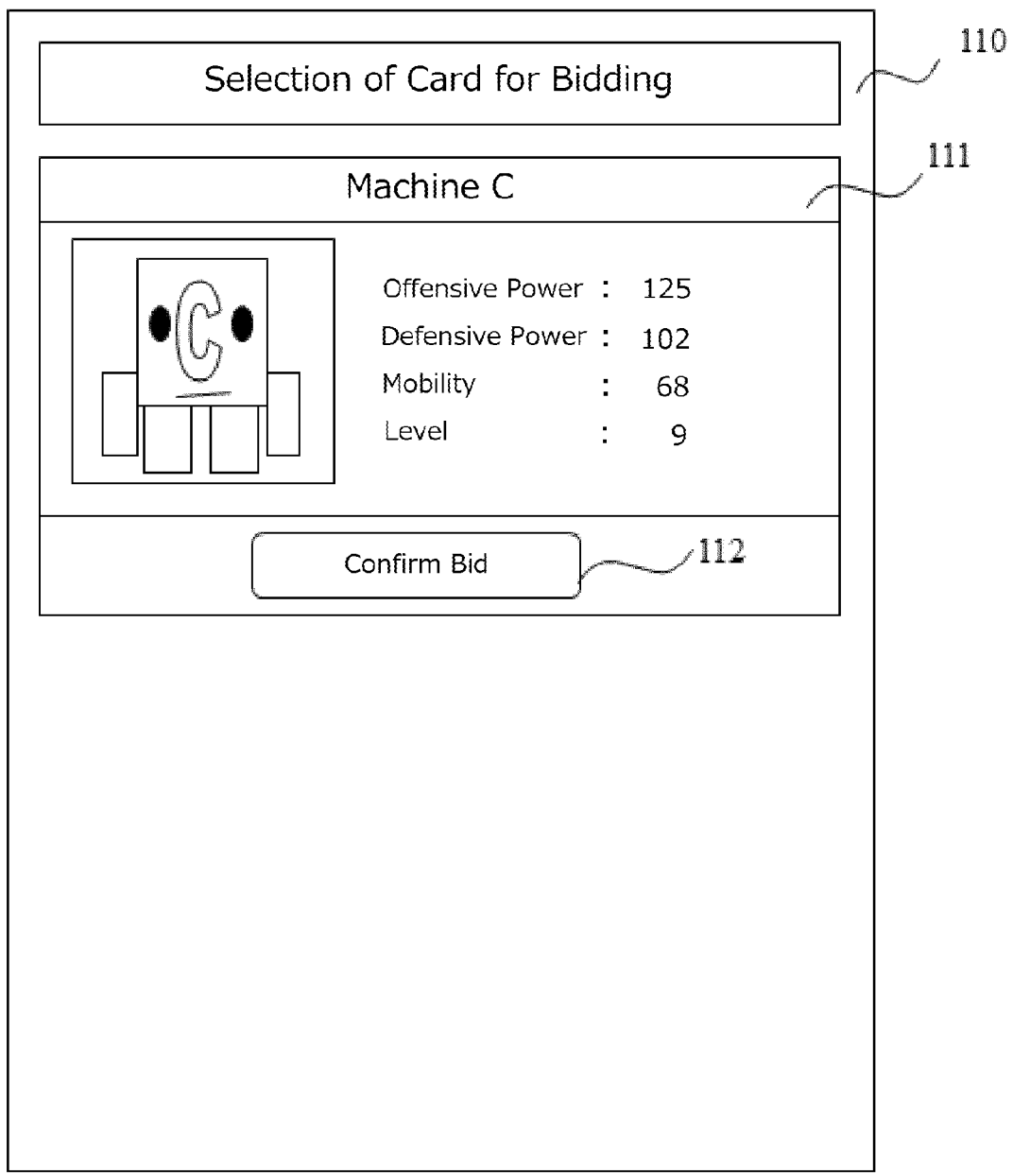
FIG. 11 shows an example of a bid game content-selecting screen in a game system according to the embodiment of the present invention.

To encourage the bidder player to select a bid game content, the terminal device 30 may display, for example, a selection screen 110 of bid game contents as shown in FIG. 11 in accordance with an instruction from game programs. The selection screen 110 may be displayed on the terminal device 30 upon, for example, operation of the operation button 93 shown in FIG. 9. The selection screen 110 may contain a bid game content display image 111 representing a game content owned by the bidder player. FIG. 11 shows an example containing only one bid game content display image 111; but the selection screen 110 may contain a number of bid game content display images, the number corresponding to the number of game contents owned by the bidder player. The bid game content display image 111 may include an operation button 112 labeled "Confirm Bid" The bidder player operates the operation button 112, so that the game content identification of the bid game content corresponding to the bid game content display image 111 is automatically included in a bid request through the function of game programs and the terminal device 30.

The bid request sent from the terminal device 30 of a bidder player may be received by the server device 10. The received bid request may be received by a bid request receiving unit 58 of the server device 10.

The bid data generating unit 59 may generate bid data based on the bid request received by the bid request receiving unit 58. More specifically, the bid data generating unit 59 may extract the game content identification of the bid game content from the received bid request, and generate bid data that includes constant information such as the name and image of the game content corresponding to the extracted game content information but does not include any of variable information on the game content and the player specifying information. As already described for exhibition data, variable information may include various information that varies in accordance with progression of the game. In an embodiment, the bid data generating unit 59 may round numerical information, among variable information, representing game content attributes with numerical values and generate bid data that include the rounded information and the constant information. Further, as with the exhibition data, the bid data generating unit 59 may convert the variable information on the bid game content in accordance with a predetermined algorithm and generate bid data that include the converted information and the constant information.

The second display control unit 60 may provide the exhibitor player with bid data generated by the bid data generating unit 59 in response to a request from the exhibitor player. When playing the game using the terminal device 30, the exhibitor player can send a bid data display request to the server device 10 by using the function of the game. For example, the exhibitor player can select an operation button or a link (now shown) labeled "Check Exhibited Cards" displayed in the game screen, thereby to request the server device 10 to display bid data corresponding to bid requests made for the exhibited game content exhibited by the exhibitor player. In response to this request, the second display control unit 60 may send bid data to the game being performed on the terminal device 30, so that a bid screen generated based on the bid data is displayed, for example, as part of a display screen of the game.

Figure 12:
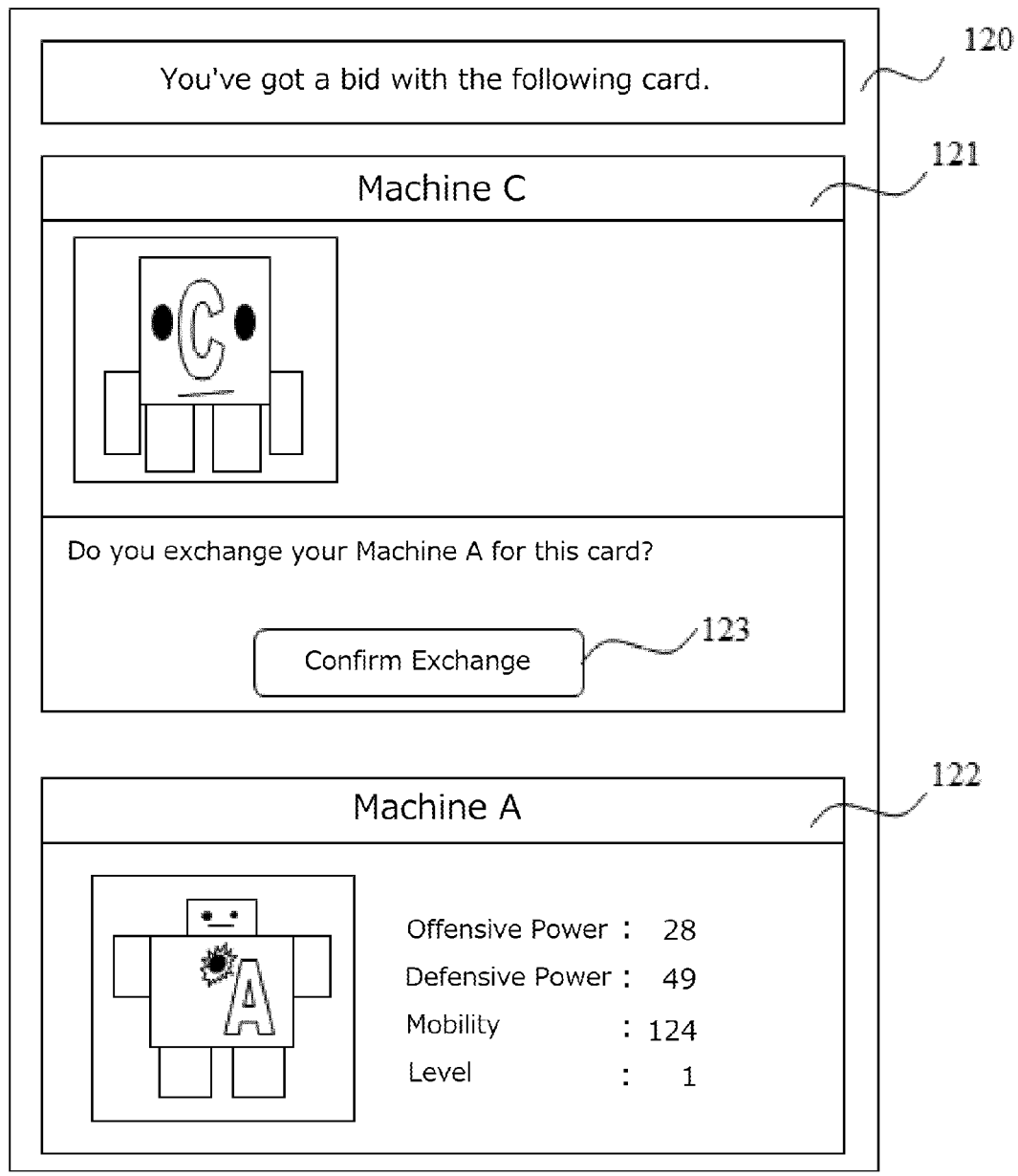
FIG. 12 shows an example of a bid screen in a game system according to the embodiment of the present invention.

FIG. 12 shows an example of bid screen on a terminal device 30 of an exhibitor player. As shown, the terminal device 30 of the exhibitor player may render received bid data to generate a bid screen 120 and display the generated bid screen 120 on the display screen of the terminal device 30 as part of the game screen. As shown, the bid screen 120 may contain a bid game content display image 121 representing a bid game content specified by the bidder player, and an exhibition data display image 122 representing the exhibited game content exhibited by the exhibitor player. The exhibitor player can grasp from the bid screen 120 that another player (a bidder player) has offered exchanging of the exhibited game content represented by the exhibition data display image 122 for the game content represented by the bid game content display image 121. The exhibitor player can select the operation button 123 displayed as part of the bid game content display image 121, thereby to exchange his own exhibited game content for the bid game content corresponding to the bid game content display image 121. More specifically, when an operation button 123 is operated, an exchange confirmation request may be generated and sent to the server device 10 through the function of the game programs and the terminal device 30. The exchange confirmation request may include the game content identifications of the set of game contents to be exchanged (the bid game content corresponding to the bid game content display image 121 and the exhibited game content corresponding to the exhibition data display image 122).

As is obvious from FIG. 12, the display screen 120 representing a bid screen may include neither variable information such as level that varies in accordance with progression of the game nor player specifying information that specifies the bidder player among attribute information of the bid game content, and may include, among attribute information of the game content, only constant information that does not vary in accordance with the progression of the game.

Figure 13:
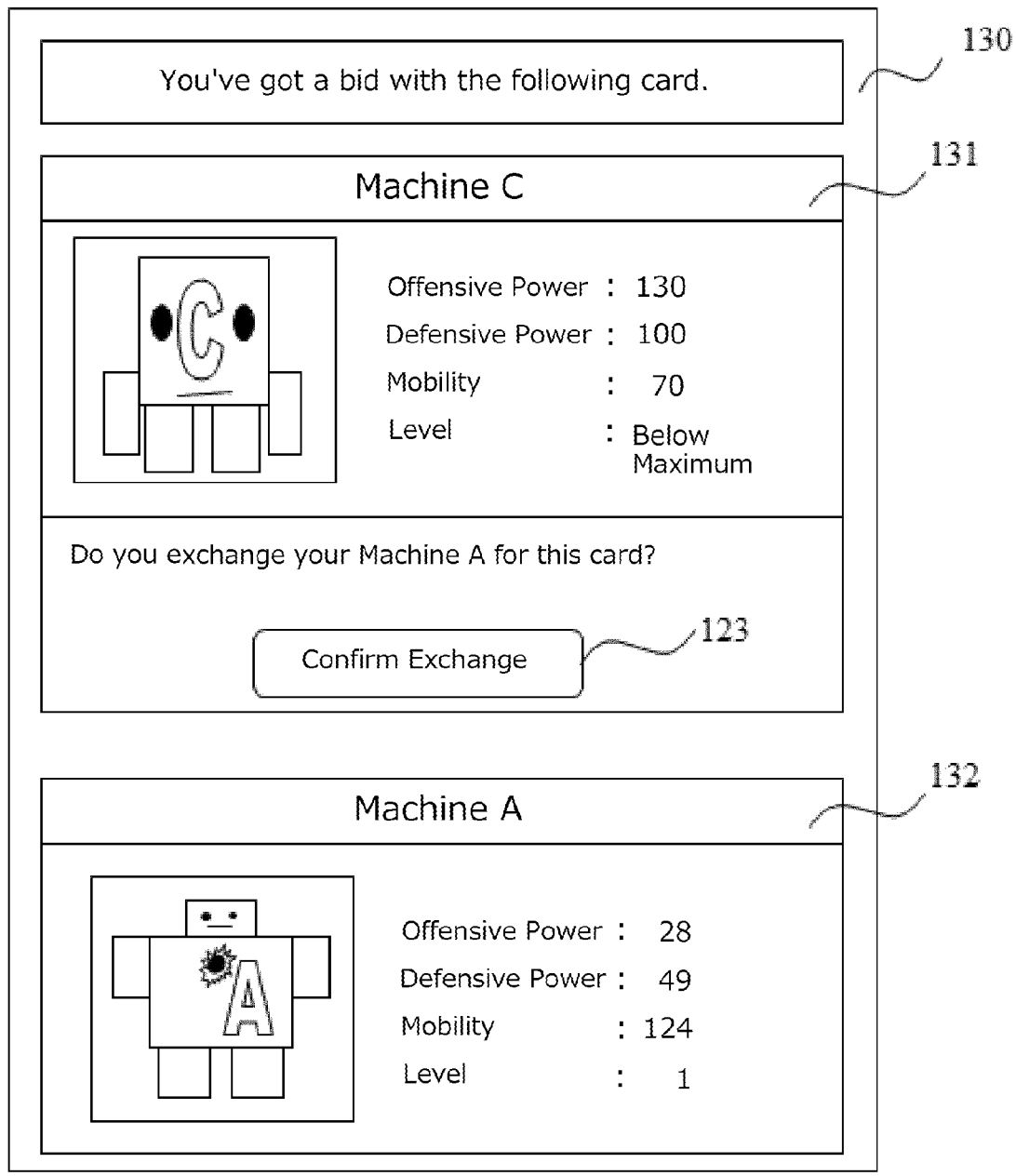
FIG. 13 shows an example of a bid screen in a game system according to another embodiment of the present invention.

FIG. 13 shows an example of a bid screen 130 in a game system according to another embodiment of the present invention. When bid data includes rounded information generated by conversion (e.g., rounding) of numerical information such as level that numerically indicates attributes of a game content or converted information generated by conversion of variable information as described above, the bid screen 130 may include text corresponding to the rounded information or the converted information, as shown in FIG. 13. The bid game content display image 131 included in the bid screen 130 shown in FIG. 13 may include rounded information, that is, offensive power "130," defensive power "100," and mobility "70" that are obtained by rounding the offensive power "125," defensive power "102," and mobility "68" stored in the attribute information table in association with the game content identification "10000031." For the level, the bid game content display image 131 may only include text such as "below the maximum" indicating whether the level has reached the predetermined maximum value. As has been already described for exhibition screen, the bid screen 130 may display a part of converted variable information (e.g., "level" converted into information representing "the maximum" or "below the maximum") and may not display the rest of the variable information (e.g., "killer technique level").

As stated above, in a game system according to the embodiment of the present invention, the exhibitor player can obtain information on the bid game content (e.g., constant information such as the name of the bid game content and the image representing the bid game content, and information such as rounded offensive power) based on the display screen such as the bid screen 120 or 130, but cannot obtain variable information that can serve as a sign or player specifying information that specifies the bidder. Further, when a bid screen is displayed to the bidder player instead of an exhibitor player, the bid screen may contain variable information on the bid game content of the bidder player and player specifying information that specifies the bidder player. That is, the variable information on the bid game content and the player specifying information that specifies the bidder player may be hidden from exhibitor players or potential exhibitor players other than the bidder player owning the bid game content.

The above exchange confirmation request may be received by the server device 10. The received exchange confirmation request may be received by an exchange confirmation request receiving unit 61.

Based on the exchange confirmation request received by the exchange confirmation request receiving unit 61, the game content identification information updating unit 62 updates the game content identification information table stored on the game content identification information storage unit 52. More specifically, the game content identification information updating unit 62 may specify the exhibited game content and the bid game content that are exchanged, based on the exchange confirmation request, and update the association between the exhibited game content and the player identification and the association between the bid game content and the player identification in the game content identification information table. For example, in the case where an exhibited game content of player 1 represented by the game content identification "00000125" and a bid game content of player 5 represented by the game content identification "10000031" are exchanged, the game content identification "00000125" corresponding to the exhibited game content that is no longer owned by player 1 after the confirmation of the exchange may be deleted from the column of Game Content Identification 2 associated with the player identification "000001" of player 1, and instead, the game content identification "10000031" corresponding to the bid game content obtained through the exchange may be stored in the column. Meanwhile, the game content identification "10000031" corresponding to the bid game content that is no longer owned by player 5 after the confirmation of the exchange may be deleted from the column of Game Content Identification 1 associated with the player identification "000005" of player 5, and instead, the game content identification "00000125" corresponding to the exhibited game content obtained through the exchange may be stored in the column.

Thus, the game content identification information table may be updated so that the bid game content originally owned by player 5 is associated with the player identification of player 1, and the exhibited game content originally owned by player 1 is associated with the player identification of player 5. FIG. 14 shows the game content identification information table after updating. Thus, the exchange of the exhibited game content of player 1 and the bid game content of player 5 may be complete.

After the exchange, player 1 can play the game using the game content represented by the game content identification "10000031" and player 5 can play the game using the game content represented by the game content identification "00000125."

When an exhibition request includes a plurality of game content identifications that identify a plurality of exhibited game contents and an exchange is concluded for the set of exhibited game contents, and/or when a bid request includes a plurality of game content identifications that identify a plurality of bid game contents and an exchange is concluded for the set of bid game contents, the game content identification information updating unit 62 may update the association of the player identification with the plurality of exhibited game contents and/or bid game contents included in the set to be exchanged in the game content identification information table. For example, when player 1 exhibits a game content specified by the game content identification "00000125" and a game content specified by the game content identification "00000130" as a set and an exchange is concluded based on this exhibition, the game content identification "00000125" may be deleted from Game Content Identification 2 associated with the player identification "000001" of player 1, and the game content identification "00000130" may be deleted from Game Content Identification 3, and these game content identifications may be stored in association with the player identification of the bidder player.

As stated above, in an embodiment of the present invention, when game contents are to be exchanged between players, the information on the exhibited game content may be presented to the bidder player in such a manner that the presented information may not include the variable information of the exhibited game content or the player specifying information that specifies the exhibitor player. Thus, in the sequential process of exchanging game contents in a game, a bidder player cannot specify the exhibitor player based on the variable information of the game content or the player specifying information. In online games, the same or similar game contents may be exhibited by multiple players; and, even if players previously agree outside the game on payment of real currency in expense of exchanged game contents, the partner of such trading outside the game cannot be specified in the game where variable information of the exhibited game content and player identifications are hidden. Thus, the game system may be provided with a function of hiding from other players the variable information of the exhibited game content and the player specifying information of the exhibitor player. Accordingly, even if a player agrees in reality with a partner on an exchange of game contents, the above function may prevent delivery of game contents in games, the game contents being an element of real trading. Accordingly, a game system according to an embodiment of the present invention restrains real money trade from a technical aspect.

In another embodiment of the present invention, when game contents are to be exchanged between players, the information on the bid game content may be presented to the exhibitor player in such a manner that the presented information may not include the variable information of the bid game content or the player specifying information that specifies the bidder player.

Thus, the exhibitor player cannot specify the bidder player in the game.

Accordingly, completion of trading in reality may be inhibited as in the above example wherein the exhibitor player is prevented from being specified. Thus, a game system according to the other embodiment of the present invention also restrains real money trade from a technical aspect.

In still another embodiment of the present invention, when game contents are to be exchanged between players, the information on the exhibited game content of the exhibitor player may be presented to the bidder player in such a manner that the presented information includes neither the variable information of the exhibited game content nor the player specifying information that specifies the exhibitor player, while the information on the bid game content of the bidder player may be presented to the exhibitor player in such a manner that the presented information includes neither the variable information of the bid game content nor the player specifying information that specifies the bidder player. This embodiment may increase the difficulty in specifying the partner of exchange of game cards in a game, thus further restraining real money trade.

Figure 15:
FIGS. 15(a) and 15(b) show examples of group management table used in a game system according to an embodiment of the present invention.

In another embodiment of the present invention, the server device 10 may further comprise a group management unit 63. The group management unit 63 may randomly group players of a game into a plurality of groups. For example, the group management unit 63 may manage groups of players with a group management table as shown in FIGS. 15(a) and 15(b). FIGS. 15(a) and 15(b) show examples of group management table for managing groups of players of a game. In FIG. 15(a), player 1, player 3, and player 5 are grouped in the first group represented by the group identification "01," while player 2 and player 4 are grouped in the second group represented by the group identification "02."

The group updating unit 64 may regularly or irregularly alter the grouping of the players in accordance with a certain algorithm. FIG. 15(b) shows an example of the group management table after the grouping is altered. In FIG. 15b, player 1 and player 2 are grouped in the first group represented by the group identification "01," while player 3, player 4, and player 5 are grouped in the second group represented by the group identification "02."

In the embodiment, the first display control unit 57 may allow display of an exhibition screen only to players grouped in the same group as the exhibitor player. Supposing that player 1 exhibits a game content when players are grouped as shown in FIG. 15(a), the exhibition screen related to the exhibited game content of player 1 can be displayed in the game screens of player 3 and player 5 in response to the requests from player 3 and player 5, but it cannot be displayed in the game screens of player 2 and player 4.

For example, even if the game content exhibited by player 1 satisfies the search conditions provided by player 2, the information on the exhibited game content of player 1 may not be displayed in the game screen of player 2.

Further, the group management unit 63 may manage a plurality of groups of game players in association with each other. For example, the group management unit 63 may associate a plurality of groups with each other by using a group classification table as shown in FIGS. 16(a) and 16(b). The purpose of such association of groups is, for example, to limit the players allowed to obtain, access, or browse exhibition data. For example, in the example shown in FIG. 16(a), group 1 is associated with groups 1, 5, and 21. In this case, the exhibition data related to a game content exhibited by a player in group 1 can be obtained and accessed by players in groups 1, 5, and 21 but cannot be obtained or accessed by players in other groups. Herein, a group allowed to obtain and access the exhibition data related to a game content exhibited by a player in a certain group may be referred to as an access-enabled group. The first display control unit 57 may allow display of an exhibition screen related to an exhibited game content exhibited by an exhibitor player only to players in groups associated with the group including the exhibitor player as an access-enabled group. For example, if the exhibitor player is in group 1, the exhibition screen may be displayed only to players in groups 1, 5, and 21.

The group updating unit 64 may regularly or irregularly alter the association of the groups in accordance with a certain algorithm. FIG. 16(b) shows an example of the group classification table after the association is altered. In the example shown in FIG. 16(b), access-enabled group 1 remains unchanged, while access-enabled groups 2 and 3 are changed. Thus, access-enabled groups may be changed partially. As is obvious from FIGS. 16(a) and 16(b), in an embodiment of the present invention, a group can be fixed as an access-enabled group with respect to the same group. That is, group 1 can be fixedly set as an access-enabled group with respect to group 1. Thus, an exhibition screen can be provided to players in a group by fixing the group as an access-enabled group with respect to the same group. As stated above with reference to FIGS. 15(a) and 15(b), an exhibition screen can be controlled to be displayed only to players in the same group as the exhibitor player. Such an example shown in FIGS. 15(a) and 15(b) can be regarded as an example of the embodiment shown in FIGS. 16(a) and 16(b) wherein a certain group is set as the access-enabled group with respect to the same group.

Thus, even if players included in different groups in the game agree in reality on payment of real currency in expense of exchanged game contents, game contents cannot be exchanged in games between these players. Since the grouping is randomly performed in accordance with a predetermined algorithm, a player cannot determine whether a trade partner in reality is in the same group. Thus, players may be randomly grouped and game contents can be exchanged only between players in the same group, thereby inhibiting implementation of a trade in reality so as to restrain real money trades.

Further, grouping of players can be altered to conceal the grouping even after a player specifies his own group. Additionally, access-enabled groups can be altered to conceal access-enabled groups. Thus, real money trade can be effectively restrained.

In another embodiment of the present invention, the server device 10 may further comprise a player management unit 65. The player management unit 65 can store player identifications of players of the game dynamically associated with player identifications of other players in, for example, the player management table shown in FIG. 17. For example, a player can register other players as "companies." The players registered as "companies" can cooperate with each other to progress a game. "A company" is registered when an offer from one player to another player is accepted. Registration of "a company" can also be canceled when any of the players performs the processing for canceling the registration of the "company."

In the embodiment, the first display control unit 57 may allow display of an exhibition screen only to players registered as "companies" of the exhibitor player. For example, when player 1 having registered "companies" as shown in FIG. 17 exhibits a game content, the exhibition screen related to the exhibited game content of player 1 may be displayed only in games played by players 2 and 5 who are companies of player 1. Meanwhile, the exhibition screen related to the exhibited game content of player 1 may not be displayed in games played by players 3 and 5.

Thus, even if players not registered as "companies" in the game agree in reality on payment of real currency in expense of exchanged game contents, game contents cannot be exchanged in games between these players. Since the maximum number of "companies" registrable is usually limited, it is unlikely that a player registers "companies" only to trade game contents. Thus, game contents are exchanged only between players registered as "companies," thereby inhibiting implementation of a trade in reality so as to restrain real money trades.

The processes and procedures described and illustrated herein may be implemented by software, hardware, or any combination thereof, in addition to those explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if the processes and the procedures described in the specification are executed by a single apparatus, software, or component in the description, the processes and the procedures can be executed by a plurality of apparatuses, software, and components. Even if the data, tables, or databases described in the specification are stored in a single memory in the description, the data, tables, or databases may be dispersed and stored in a plurality of memories included in a single apparatus or in a plurality of memories dispersed and arranged in a plurality of apparatuses. The elements of the software and the hardware described in the specification can be integrated into fewer constituent elements or can be decomposed into more constituent elements.

With respect to the use of substantially any plural and/or singular terms herein, in addition to terms used without designation of being either plural or singular, those having skill in the art can translate from the plural to the singular and/or from the singular to the plural as is appropriate to the context.

What is claimed is:

1. A game system comprising:
   one or more processors configured to execute computer programs;
   memory storage configured to store machine readable instructions, when executed, causing the one or more processors to execute a game for providing the game on terminal devices, wherein providing the game on the terminal devices comprising:
   storing one or more game programs for performing a game using at least a first game content and a second game content;
   storing a first game content identification unique to the first game content in association with a first player identification unique to a first player, and storing a second game content identification unique to the second game content in association with a second player identification unique to a second player;
   storing first attribute information indicating attributes of the first game content in association with the first game content identification, the first attribute information including first variable information varying with progression of the game and first constant information not varying with progression of the game, and storing second attribute information indicating attributes of the second game content in association with the second game content identification, the second attribute information including second variable information varying with progression of the game and second constant information not varying with progression of the game;
   storing first player specifying information for specifying the first player and second player specifying information for specifying the second player;
   generating exhibition data including the first attribute information;
   causing an exhibition screen generated based on the exhibition data to be displayed in the game played by the second player;
   receiving from the second player a bid request including the first game content identification and the second game content identification;
   generating bid data based on the bid request, the bid data including the second constant information while not including either the second player specifying information or the second variable information;
   causing a bid screen generated based on the bid data to be displayed in the game played by the first player;
   receiving from the first player an exchange confirmation request including the second game content identification; and
   updating the stored game content identification information storage unit based on the exchange confirmation request such that the first game content identification is stored in association with the second player identification, and the second game content identification is stored in association with the first player identification.

2. The game system of claim 1, wherein the bid data is generated to include second converted information and the second constant information while not including either the second player specifying information or the second variable information, the second converted information being obtained by converting the second variable information in accordance with a predetermined algorithm.

3. The game system of claim 1, wherein
   the second variable information includes second numerical information numerically indicating the attributes of the second game content, and
   the bid data is generated to include second rounded information and the second constant information while not including either the second player specifying information or the second variable information, the second rounded information being generated by rounding the second numerical information.

4. The game system of claim 1, wherein providing the game further comprises:
   storing a third game content identification unique to a third game content used in the game in association with the first player identification unique to the first player, and storing a fourth game content identification unique to a fourth game content used in the game in association with the second player identification unique to the second player;
   storing third attribute information indicating attributes of the third game content in association with the third game content identification, the third attribute information including third variable information varying with progression of the game and third constant information not varying with progression of the game, and further storing fourth attribute information indicating attributes of the fourth game content in association with the fourth game content identification, the fourth attribute information including fourth variable information varying with progression of the game and fourth constant information not varying with progression of the game;
   generating the exhibition data including the first attribute information and the third attribute information;
   receiving from the second player a bid request including the first game content identification, the second game content identification, the third game content identification, and the fourth game content identification; and
   generating the bid data based on the bid request, the bid data including the second constant information and the fourth constant information while not including any of the second player specifying information, the second variable information, and the fourth variable information; and, wherein
   the exchange confirmation request includes the second game content identification and the fourth game content identification; and
   the stored game content identification information is updated based on the exchange confirmation request such that the first game content identification and the third game content identification are stored in association with the second player identification, and the second game content identification and the fourth game content identification are stored in association with the first player identification.

5. The game system of claim 1, wherein the exhibition data is generated to not include either the first variable information or the first player specifying information.

6. The game system of claim 1, wherein providing the game further comprises randomly grouping a plurality of players of the game into a plurality of groups and associating the plurality of groups with each other,
   wherein the exhibition screen is caused to be displayed in the game played by the second player only when a first group including the first player is associated with a group including the second player.

7. The game system of claim 1, wherein providing the game further comprises storing a plurality of player identifications each being unique to a corresponding player of the game, wherein the plurality of player identifications are dynamically associated with each other,
   wherein the exhibition screen is caused to be displayed in the game played by the second player only when the second player identification in association with the first player identification is stored.

8. The game system of claim 1, wherein providing the game further comprises receiving from the first player an exhibition request including the first game content identification and setting information related to the first game content,
   wherein the setting information is altered and the exhibition data is generated to not include the altered setting information and the first game content identification.

9. The game system of claim 1, wherein providing the game further comprises receiving from the first player an exhibition request including the first game content identification and setting information related to the first game content,
   wherein the setting information is selected from a limited number of preset options,
   and the exhibition data generated to not include the setting information and the first game content identification.

10. A game system comprising:
   one or more processors configured to execute computer programs;
   memory storage configured to store machine readable instructions, when executed, causing the one or more processors to execute a game for providing the game on terminal devices, wherein providing the game on the terminal devices comprising:
   storing one or more game programs for performing a game using at least a first game content and a second game content;
   storing a first game content identification unique to the first game content in association with a first player identification unique to a first player, and storing a second game content identification unique to the second game content in association with a second player identification unique to a second player;
   storing first attribute information indicating attributes of the first game content in association with the first game content identification, the first attribute information including first variable information varying with progression of the game and first constant information not varying with progression of the game, and storing second attribute information indicating attributes of the second game content in association with the second game content identification, the second attribute information including second variable information varying with progression of the game and second constant information not varying with progression of the game;
   storing first player specifying information for specifying the first player and second player specifying information for specifying the second player;
   generating exhibition data including the first constant information while not including either the first player specifying information or the first variable information;
   causing an exhibition screen generated based on the exhibition data to be displayed in the game played by the second player;
   receiving from the second player a bid request including the first game content identification and the second game content identification;
   generating bid data based on the bid request, the bid data including the second attribute information;
   causing a bid screen generated based on the bid data to be displayed in the game played by the first player;
   receiving from the first player an exchange confirmation request including the second game content identification; and
   updating the stored game content identification information based on the exchange confirmation request such that the first game content identification is stored in association with the second player identification, and the second game content identification is stored in association with the first player identification.

11. The game system of claim 10, wherein the exhibition data is generated to include first converted information and the first constant information while not including either the first player specifying information or the first variable information, the first converted information being obtained by converting the first variable information in accordance with a predetermined algorithm.

12. The game system of claim 10, wherein
   the first variable information includes first numerical information numerically indicating the attributes of the first game content, and
   the exhibition data is generated to include first rounded information and the first constant information while not including either the first player specifying information or the first variable information, the first rounded information being generated by rounding the first numerical information.

13. The game system of claim 10, wherein providing the game further comprises:
   storing a third game content identification unique to a third game content used in the game in association with the first player identification unique to the first player, and storing a fourth game content identification unique to a fourth game content used in the game in association with the second player identification unique to the second player;
   storing third attribute information indicating attributes of the third game content in association with the third game content identification, the third attribute information including third variable information varying with progression of the game and third constant information not varying with progression of the game, and further storing fourth attribute information indicating attributes of the fourth game content in association with the fourth game content identification, the fourth attribute information including fourth variable information varying with progression of the game and fourth constant information not varying with progression of the game;
   generating the exhibition data including the first constant information and the third constant information while not including any of the first player specifying information, the first variable information, and the third variable information;
   receiving from the second player a bid request including the first game content identification, the second game content identification, the third game content identification, and the fourth game content identification;

generating the bid data based on the bid request, the bid data including the second attribute information and the fourth attribute information; and, wherein the exchange confirmation request includes the second game content identification and the fourth game content identification; and the stored game content identification information is updated based on the exchange confirmation request such that the first game content identification and the third game content identification are stored in association with the second player identification, and the second game content identification and the fourth game content identification are stored in association with the first player identification.

14. The game system of claim 10, wherein the bid data is generated to not include either the second player specifying information or the second variable information.

15. A non-transitory computer-readable storage medium storing a game program for causing a computer to provide a game on terminal devices, providing the game on terminal devices comprising:

storing one or more game programs for performing a game using at least a first game content and a second game content;

storing a first game content identification unique to the first game content in association with a first player identification unique to a first player, and storing a second game content identification unique to the second game content in association with a second player identification unique to a second player;

storing first attribute information indicating attributes of the first game content in association with the first game content identification, the first attribute information including first variable information varying with progression of the game and first constant information not varying with progression of the game, and storing second attribute information indicating attributes of the second game content in association with the second game content identification, the second attribute information including second variable information varying with progression of the game and second constant information not varying with progression of the game;

storing first player specifying information for specifying the first player and second player specifying information for specifying the second player;

generating exhibition data including the first attribute information;

causing an exhibition screen generated based on the exhibition data to be displayed in the game played by the second player;

receiving from the second player a bid request including the first game content identification and the second game content identification;

generating bid data based on the bid request, the bid data including the second constant information while not including either the second player specifying information or the second variable information;

causing a bid screen generated based on the bid data to be displayed in the game played by the first player;

receiving from the first player an exchange confirmation request including the second game content identification; and updating the stored game content identification information based on the exchange confirmation request such that the first game content identification is stored in association with the second player identification, and the second game content identification is stored in association with the first player identification.

16. A non-transitory computer-readable storage medium storing a game program for causing a computer to provide a game on terminal devices, providing the game on terminal devices comprising:

storing one or more game programs for performing a game using at least a first game content and a second game content;

storing a first game content identification unique to the first game content in association with a first player identification unique to a first player, and storing a second game content identification unique to the second game content in association with a second player identification unique to a second player;

storing first attribute information indicating attributes of the first game content in association with the first game content identification, the first attribute information including first variable information varying with progression of the game and first constant information not varying with progression of the game, and storing second attribute information indicating attributes of the second game content in association with the second game content identification, the second attribute information including second variable information varying with progression of the game and second constant information not varying with progression of the game;

storing first player specifying information for specifying the first player and second player specifying information for specifying the second player;

generating exhibition data including the first constant information while not including either the first player specifying information or the first variable information;

causing an exhibition screen generated based on the exhibition data to be displayed in the game played by the second player;

receiving from the second player a bid request including the first game content identification and the second game content identification;

generating bid data based on the bid request, the bid data including the second attribute information;

causing a bid screen generated based on the bid data to be displayed in the game played by the first player;

receiving from the first player an exchange confirmation request including the second game content identification; and updating the stored game content identification information based on the exchange confirmation request such that the first game content identification is stored in association with the second player identification, and the second game content identification is stored in association with the first player identification.

* * * * *